United States Patent
Pansier

[11] Patent Number: 5,831,839
[45] Date of Patent: Nov. 3, 1998

[54] SWITCHED-MODE POWER SUPPLY

[75] Inventor: Frans Pansier, Eindhoven, Netherlands

[73] Assignee: U.S. Philips Corporation, New York, N.Y.

[21] Appl. No.: 927,831

[22] Filed: Sep. 11, 1997

[30] Foreign Application Priority Data

Mar. 21, 1997 [EP] European Pat. Off. .............. 97200855

[51] Int. Cl.⁶ .................................................. H02M 3/335
[52] U.S. Cl. ............................................. 363/21; 323/285
[58] Field of Search .................................. 363/20, 21, 56, 363/97; 323/285, 902

[56] References Cited

U.S. PATENT DOCUMENTS

| | | | |
|---|---|---|---|
| 3,771,040 | 11/1973 | Fletcher et al. | 363/21 |
| 4,073,003 | 2/1978 | Chambers | 363/20 |
| 4,456,872 | 6/1984 | Froeschle | 323/286 |
| 5,008,796 | 4/1991 | Johnson | 363/21 |
| 5,305,192 | 4/1994 | Bonte et al. | 363/21 |
| 5,412,556 | 5/1995 | Marinus | 363/21 |
| 5,438,499 | 8/1995 | Bonte et al. | 363/21 |
| 5,675,480 | 10/1997 | Stanford | 363/21 |
| 5,757,625 | 5/1998 | Schoofs | 363/21 |

*Primary Examiner*—Adolf Berhane
*Attorney, Agent, or Firm*—Edward W. Goodman

[57] ABSTRACT

A switched-mode power supply includes a transformer (T) with a primary winding (Lp), a secondary winding (Ls), and an auxiliary winding (La). A series arrangement of the primary winding (Lp) and a controllable switching element (S1) receives an input voltage (Vi). A drive circuit (1) supplies a drive signal to a control input of the controllable switching element (S1) for periodically switching the controllable switching element (S1) on and off. The secondary winding (Ls) supplies a DC output voltage (Vout) to a load (Z) via a rectifier element (D). The DC output voltage (Vout) is stabilized by averaging (21), during a certain period of time, information (Im;Id) related to feedback information (Va;Icon) supplied by the auxiliary winding (La). The certain period of time is obtained by detecting when the feedback information (Va;Icon) is larger than a certain reference value (Vref;Iref2) which is selected in such a way that a substantial part of both the leading and trailing edges of the feedback information (Va;Icon) do not occur within the certain period of time.

10 Claims, 5 Drawing Sheets

SWITCHED-MODE POWER SUPPLY

BACKGROUND OF THE INVENTION

1. Field of the Invention

The invention relates to a switched-mode power supply which stabilizes an output voltage by averaging feedback information during a certain period. The invention also relates to a display apparatus comprising such a switched-mode power supply.

2. Description of the Related Art

The non-prepublished International Application PCT/IB96/00972, corresponding to U.S. patent application Ser. No. 08/722,652, filed Sep. 30, 1996, now U.S. Pat. No. 5,757,625 (Attorney's docket PHN 15,485), discloses a switched-mode power supply which comprises a transformer with a primary winding and a secondary winding. The primary winding is connected to an input supply voltage via a controllable switching element in order to obtain a periodically interrupted primary current through the primary winding by opening and closing of the switching element under the control of a drive signal. The primary winding is also used as a feedback winding for generating a measurement signal. The secondary winding is connected, via a rectifier diode, to a parallel arrangement of a smoothing capacitor and a load to supply a DC output voltage to the load. The switched-mode power supply further comprises a drive circuit for generating the drive signal in response to the measurement signal, in order to stabilize the DC output voltage. In an embodiment, the switched-mode power supply further comprises a time-window generator for generating a time-window signal for time-selectively transferring the measurement signal in the open state of the switching element. Several ways of obtaining the time window corresponding to the period when the switching element is open, are disclosed. The start of the time window is determined by measuring a voltage across a resistor which is part of a snubber circuit arranged in parallel with the primary winding, or by measuring a voltage across a resistor arranged in series with the primary winding, or by the switch-off instant of the controllable switching element. The end of the time window is determined by measuring a voltage across the primary winding, or by the switch-on instant of the controllable switching element in the case of a continuous-mode operation of the switched-mode power supply.

The voltage across the primary winding is supplied to an input of a current mirror via a resistor. The output of the current mirror supplies a control current which depends on the voltage across the primary winding. A difference current is generated by subtracting a reference current from the control current. The difference current flows to a capacitor via a switch which is only closed during the time window to charge or discharge the capacitor only during this time window. The voltage on the capacitor determines the drive signal.

The time-window generator must be capable of withstanding high voltages as it is connected to the primary winding, so an expensive high-voltage integrated circuit has to be used if, for cost efficiency, the time-window generator is integrated.

SUMMARY OF THE INVENTION

It is an object of the invention to provide an economic and low-cost switched-mode power supply.

A first aspect of the invention provides a switched-mode power supply comprising:

- a transformer (T) having a primary winding (Lp), a secondary winding Ls, and an auxiliary winding La, the secondary winding (Ls) being coupled to a smoothing capacitor (Cs) via a rectifier element (D) to supply a DC output voltage (Vout),
- a controllable switching device (S1) having a main current path arranged in a series arrangement with the primary winding (Lp), the series arrangement receiving an input voltage (Vin),
- a drive circuit (1) for supplying a drive signal (Dr) to a control input of the controllable switching device (S1) for periodically switching the controllable switching device (S1) on and off, and
- a feedback circuit (2) coupled to receive feedback information (Va; Icon) from the auxiliary winding (La) for supplying a control signal (Co) to the drive circuit (1) to control on and/or off-periods of the controllable switching element (S1) to obtain a desired value of the feedback information (Va; Icon) in a steady-state situation, the feedback circuit (2) comprising window-generating means (20) coupled to receive the feedback information Va; Icon for supplying an indication signal (Wi) indicative of a period of time during which the feedback information (Va; Icon) is related to the DC output voltage (Vout), the feedback circuit (2) further comprising averaging means (21) coupled to receive information related to the feedback information (Im; Id) and the indication signal Wi for averaging the information related to the feedback information (Im;Id) during said period of time to obtain the control signal (Co).

A second aspect of the invention provides a display apparatus which comprises a switched-mode power supply as described above.

The switched-mode power supply according to the invention comprises an auxiliary winding on the transformer to supply feedback information to a feedback circuit. The feedback circuit comprises an averaging circuit and a window circuit. The window circuit generates an indication signal for indicating a period of time. The averaging circuit averages information related to the feedback information during said period of time. The information related to the feedback information may be the information signal, or a difference of the information signal and an information reference value. The abovementioned, non-prepublished application PCT/IB96/00972 does not disclose a window circuit which generates the period of time for activating an averaging circuit by using an auxiliary winding. By using such an auxiliary winding, no high voltages occur and a cheap low voltage circuit can be used.

U.S. Pat. No. 5,008,796 discloses a switched-mode power supply comprising a transformer with a primary, a secondary, and an auxiliary winding. The primary winding is coupled to an input voltage via a transistor which is periodically conductive and non-conductive. The secondary winding is connected to a parallel arrangement of a smoothing capacitor and a load via a secondary rectifier diode to supply a DC supply voltage to the load. To achieve a regulation of the DC output voltage, the voltage generated by the auxiliary winding is rectified with an auxiliary rectifier diode and stored on a sampling capacitor. The auxiliary rectifier diode has an orientation to conduct during substantially the same period of time during which the secondary rectifier diode conducts. In this way, the voltage supplied by the auxiliary rectifier diode is related to the DC output voltage. An amplifier compares the voltage on the sampling capacitor with a reference voltage and supplies an error signal to a pulse width modulator. The pulse width modulator has an output coupled to a gate of the transistor. The conduction time of the transistor is adjusted, depending on the error signal in order to maintain a constant voltage on the sampling capacitor in an attempt to stabilize the DC supply voltage. Due to a good coupling of the auxiliary winding with the primary winding, an overshoot, occurring on the primary winding in response to a leakage between the primary and the secondary winding, occurs also on the auxiliary winding. This overshoot on the auxiliary winding is fed to the sampling capacitor by the auxiliary rectifier diode which, together with the sampling capacitor, acts as a peak rectifier. The regulation of the DC supply voltage will be poor. The power supply disclosed in U.S. Pat. No. 5,008,796 minimizes the influence of this overshoot by providing a circuit comprising a switch which is interposed between the auxiliary winding and the sampling capacitor, and a switch-actuating circuit for disconnecting the auxiliary winding from the sampling capacitor a predetermined interval after the auxiliary winding voltage has exceeded a predetermined reference voltage. The switch thus disconnects the auxiliary winding voltage from the sampling capacitor at the instant when the auxiliary winding voltage exceeds the predetermined reference voltage and will stay disconnected until the predetermined interval ends. The predetermined interval should end sufficiently in time before the trailing edge of the auxiliary winding occurs, so as to be able to sample the auxiliary winding voltage during the conduction time of the secondary rectifier diode, as only during this time the auxiliary winding voltage provides information about the value of the DC supply voltage supplied by the secondary winding. The prior art does not disclose an averaging or integrating of the feedback information. In contrast, together with the sampling capacitor, the diode connected between the auxiliary winding and the sampling capacitor causes a peak rectification of the auxiliary winding voltage.

In a switched-mode power supply according to the invention, in which information related to the feedback information is averaged during a period of time to obtain a drive signal for the controllable switching element in series with the primary winding, the teaching of the prior art is not relevant as the problem of peak rectification does not occur.

The overshoot part of the auxiliary winding voltage which, in fact, is a series of overshoots and undershoots will be averaged by the averaging operation. The averaging during the overshoot part of the auxiliary winding voltage supplies a somewhat too high averaging result, which somewhat compensates for the too low averaging result during (part of) the leading and trailing edges. The teaching of the prior art would even deteriorate the regulation behavior of the switched-mode power supply according to the invention which uses averaging of the feedback information. This is caused by the fact that the averaging period now does not include the overshoot part of the auxiliary winding voltage, and the contribution of the trailing edge to the averaging result thus has a larger impact. The averaging result will show an even lower value.

In another embodiment of the invention, the window circuit generates the indication signal for indicating the period of time by detecting during which period of time the feedback information received from the auxiliary winding is larger than a predetermined detection reference value. In this way, it is possible to define the start and end of the period of time by using the feedback information only.

The above-mentioned, non-prepublished application PCT/IB96/00972 does not disclose a window circuit which generates the period of time for activating an averaging circuit by only detecting when the feedback current is larger than a reference current. The time-window generator of the non-prepublished PCT application is complicated because different circuits are needed to obtain the start and the end, respectively, of the time window. As only one signal has to be processed, the feedback circuit according to the invention simplifies the circuit design. If the feedback circuit is part of an integrated circuit, the processing of only one information component instead of two has the further advantage that the integrated circuit needs one pin less. If the time-window circuit of the above-mentioned non-prepublished PCT application determines the start or end moment of the window by using the switch-off or on instant of the controllable switching element, respectively, the regulation behavior will be deteriorated because the leading edge or trailing edge of the feedback signal will also contribute to the averaging result. In the feedback circuit according to the invention, the predetermined detection reference value is selected near the desired value of the feedback information which occurs in the steady state in which the DC output voltage has the desired stabilized value. This selection of the detection value causes an averaging of the feedback information which substantially occurs between the leading and trailing slopes of the feedback information, thereby minimizing the detrimental influence of the slopes and thus obtaining an improved regulation.

The prior-art US patent does not disclose that the switch is closed during a period of time when the auxiliary winding voltage is above a predetermined reference value which is selected in such a way that the leading and trailing edges of the auxiliary winding voltage substantially do not occur within that period of time. Furthermore, as elucidated earlier, the teaching of the prior art would even deteriorate the regulation behavior of the switched-mode power supply according to the invention which uses averaging of the feedback information.

In another embodiment of the invention, the feedback voltage supplied by the auxiliary winding is converted into a feedback current by a resistor arranged between the auxiliary winding and an input of a current mirror. As the current mirror has a fixed voltage at its input, the feedback current is a good reproduction of the feedback voltage. The feedback current is averaged by the averaging circuit.

Another embodiment of the invention has the advantage that the averaging circuit only needs to average the difference between the feedback current and the feedback reference current. This ensures a stable operation of the power supply regulation. In the steady-state situation, in which the DC output voltage is stabilized on the desired value, the difference is zero. If the feedback information becomes larger than the feedback reference value, the averaging circuit averages the non-zero difference and controls the controllable switching element to decrease the feedback information until the difference is again zero, thereby stabilizing the DC output voltage. In this way, it is not necessary to take precautions to reset the averaging circuit before the next averaging period in order to prevent a cumulative averaging result.

Another embodiment of the invention has the advantage that the predetermined reference value is a fixed ratio of the feedback reference value. As the feedback reference value is the value of the feedback information in a steady-state situation, the period of time during which the feedback information is larger than the predetermined reference can easily be determined by selecting the appropriate ratio. The factor is advantageously selected in a range of 0.5 to 0.95.

A factor below 0.5 causes a too large part of the leading and trailing edges to contribute to the averaging result. A factor above 0.8 is preferred. A factor above 0.95 causes the risk that no time period would be generated if the feedback information had a too small value due to a sudden and large increase of the load on the DC output voltage.

Another embodiment of the invention prevents ringing in the auxiliary winding voltage, which may occur when the rectifier element connected to the secondary winding stops conducting, from starting an averaging action at a moment when the voltage on the auxiliary winding is not related to the DC output voltage.

Another embodiment of the invention offers the flexibility to use an opto-coupler feedback in case an even better regulation is needed than is possible with the use of the auxiliary winding voltage. The opto-coupler transistor is connected to the capacitor. As the opto-coupler supplies much more current to the capacitor than the feedback circuit during a non-steady state situation in which the DC output voltage has not the desired value, the regulation of the switched-mode power supply is effected by the current through the opto-coupler.

These and other aspects of the invention are apparent from and will be elucidated with reference to the embodiments described hereinafter.

DESCRIPTION OF THE PREFERRED EMBODIMENTS

Figure 1:
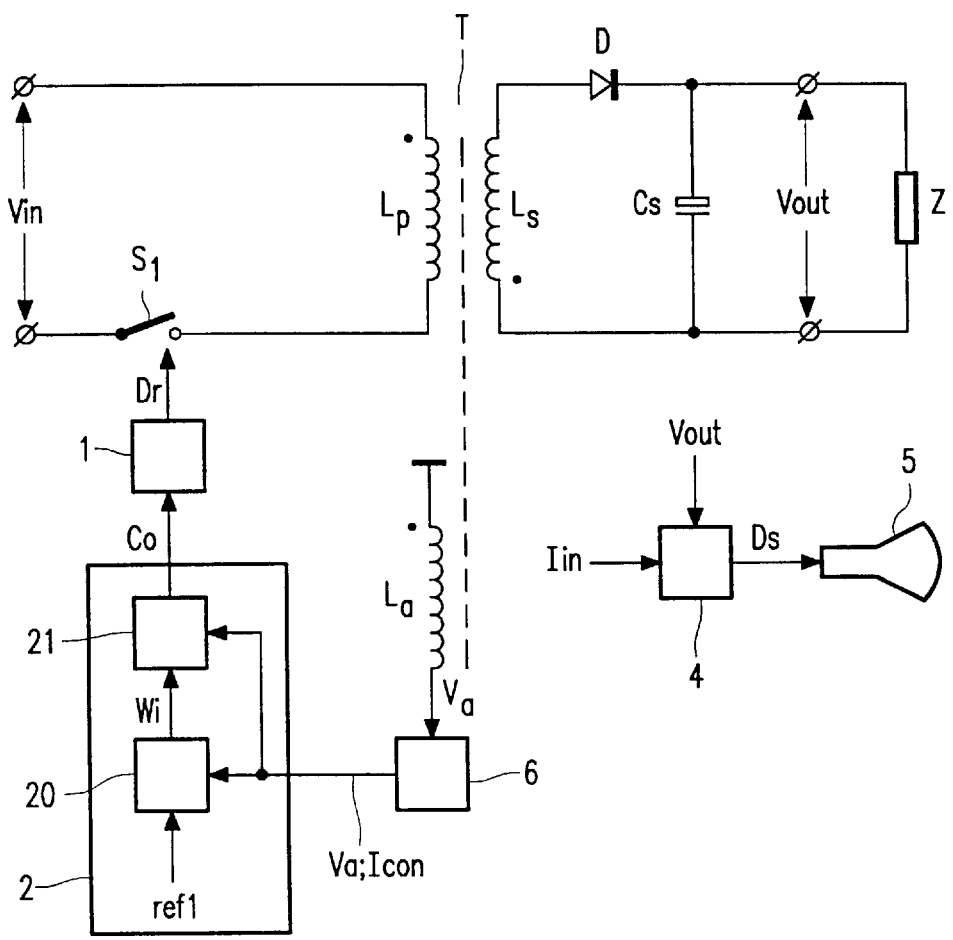
FIG. 1 shows a block diagram of a display apparatus comprising a switched-mode power supply according to the invention.

FIG. 1 shows a block diagram of a display apparatus comprising a switched-mode power supply according to the invention.

The display apparatus comprises a display device 5, which may be a cathode ray tube or a matrix display, such as, a Liquid Crystal Display, a signal-processing circuit 4, which processes input display information Iin to obtain drive signals Ds suitable to drive the display device 5, and a switched-mode power supply to supply voltages, such as, the DC output voltage Vout to the signal-processing circuit 4 and the display device 5.

The switched-mode power supply comprises a transformer T with a primary winding Lp, a secondary winding Ls and an auxiliary winding La. A controllable switching element S1 is arranged in series with the primary winding Lp, the series arrangement receiving an input voltage Vin. The input voltage Vin may be a rectified line voltage. The controllable switching element S1 receives, at its control input, a drive signal Dr from a drive circuit 1 for periodically switching on and off the controllable switching element S1 to obtain a periodically changing primary current in the primary winding Lp. The secondary winding Ls supplies a DC output voltage Vout to a parallel arrangement of a smoothing capacitor Cs and a load Z via a secondary rectifier diode D. In the shown flyback converter, the primary current starts ramping at the instant when the controllable switching element S1 is closed. At the instant when the controllable switching element S1 opens, the voltage across the primary winding Lp changes sign and the secondary rectifier diode D starts conducting, thereby transporting the energy stored in the primary winding Lp, via the secondary winding Ls, to the load Z. In most applications, the DC output voltage Vout should be stabilized. Therefore, the transformer T comprises the auxiliary winding La. This winding supplies an auxiliary winding voltage Va which is closely related to the DC-output voltage during a period of time when the secondary diode D conducts. A feedback circuit 2 receives feedback information Va;Icon which is the auxiliary winding voltage Va and/or a feedback current Icon related to the auxiliary winding voltage Va to supply a control information Co to the drive circuit 1 to influence the on and/or off-time of the controllable switching element S1 for obtaining a desired value of the feedback voltage Va and ,thus, of the DC output voltage Vout. The feedback circuit 2 comprises a window-generating circuit 20 which receives the feedback information Va;Icon and a reference value ref1 to supply an indication signal Wi indicating a period of time (also referred to as window period) during which the feedback information Va;Icon is larger than the reference value ref1. The feedback circuit 2 further comprises an averaging circuit 21 receiving the feedback information Va;Icon and the indication signal Wi for averaging an information related to the feedback information during the window period.

Figure 2:
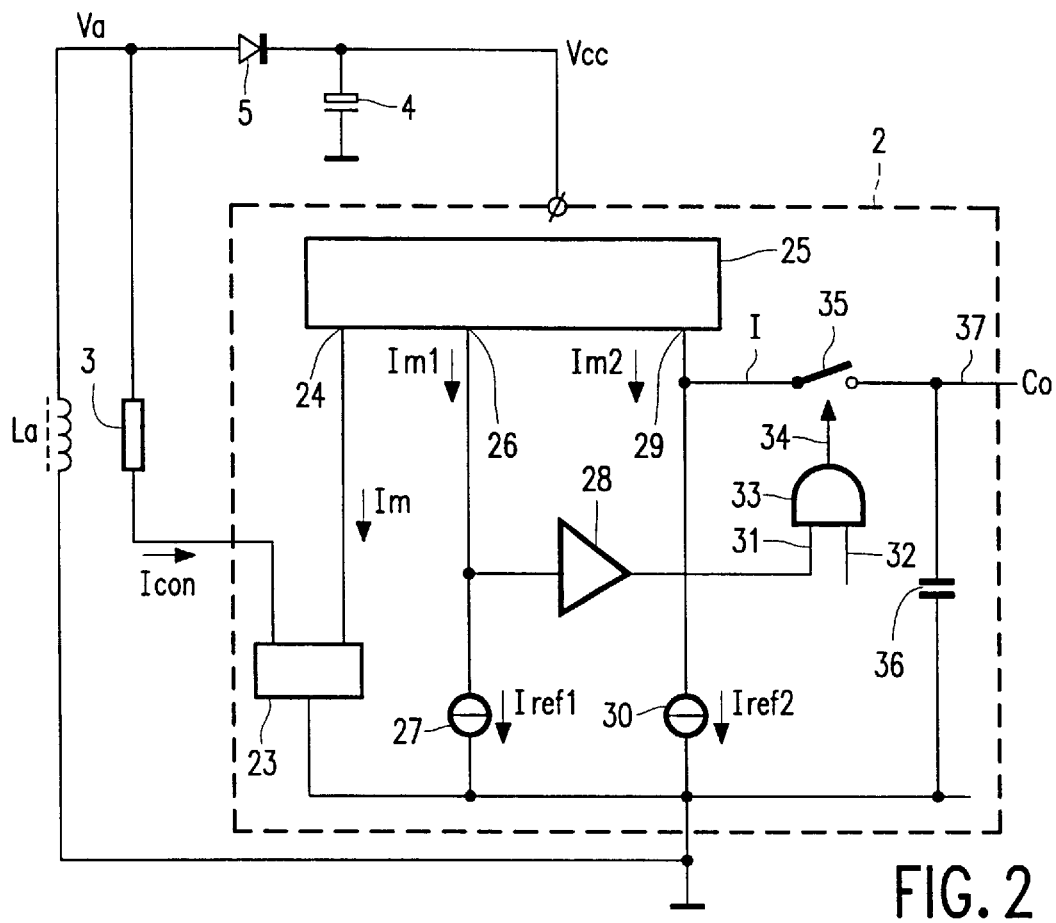
FIG. 2 shows a detailed circuit diagram of an embodiment of the feedback circuit according to the invention.
Figure 3:
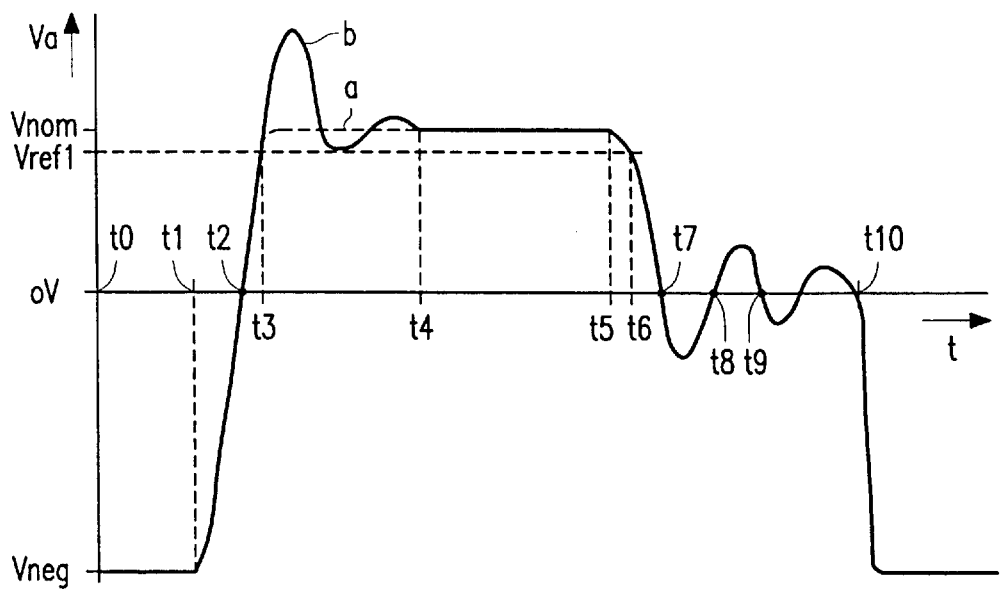
FIG. 3 shows a waveform of the voltage supplied by the auxiliary winding of the switched-mode power supply according to the invention.

The operation of the switched-mode power supply as shown in FIG. 1 with a feedback circuit as shown in FIG. 2 is described with respect to the waveform shown in FIG. 3.

FIG. 2 shows a detailed circuit diagram of an embodiment of the feedback circuit 2 according to the invention. The auxiliary winding La has a first end connected to primary ground, and a second end connected to a feedback input of the feedback circuit 2 via a resistor 3. The feedback circuit 2 may be an integrated circuit (further referred to as IC) or a circuit with discrete components. The embodiment shown in FIG. 2 is based on an IC implementation. The second end of the auxiliary winding La may also be connected, via a rectifier 5, to a smoothing capacitor 4 to generate a supply voltage Vcc for the circuits at the primary side of the switched-mode power supply.

A feedback current Icon flows through resistor 3 to an input of a first current mirror 23. The first current mirror 23 causes a stable voltage on the feedback input, which may be close to primary ground potential, to obtain a feedback current Icon which is a good reproduction of the auxiliary winding voltage Va. The current mirror 23 has an output which supplies a mirrored feedback current Im to an input 24 of a second current mirror 25. The second current mirror 25 mirrors the mirrored feedback current Im to generate two output currents Im1 and Im2 on outputs 26 and 29, respectively.

Figure 6:
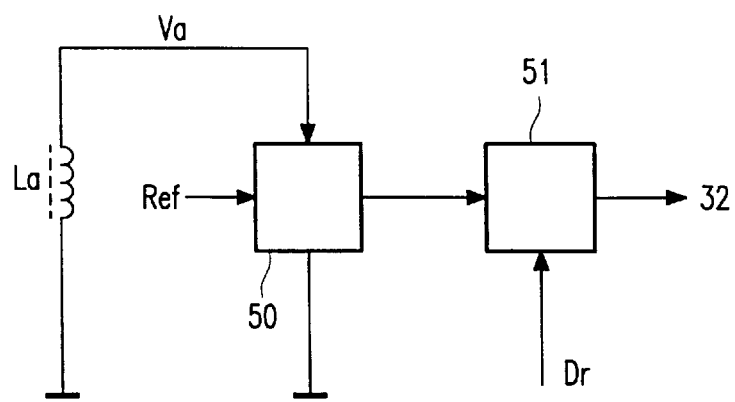
FIG. 6 shows a block diagram of a circuit generating a demagnetization protection signal.

The output 26 is connected to primary ground via a current source 27. The current source 27 supplies a current Iref1 flowing to primary ground. A buffer 28, with a high gain and a high input impedance, has an input which is connected to the output 26. Due to the fact that the current mirror 25 and the current source 27 have a very high but finite impedance, the voltage at this node is high when the output current Im1 is larger than the reference current Iref1, and low when the output current Im1 is smaller than the reference current Iref1. An output of buffer 28 is connected to an input 31 of a two-input logic AND-gate 33. The other input 32 of this AND-gate 33 receives a demagnetizing signal generated by a demagnetizing sensing circuit 50, 51 as shown in FIG. 6. The demagnetizing signal is high during demagnetization of the transformer, and low during the remainder of the switched-mode power supply switching cycle. An output 34 of the AND-gate 33 is connected to a control input of the controllable switch 35. The switch 35 is in a conductive state when the output 34 supplies a high level.

The output 29 of the current mirror 25 is connected at a node 38 to a current source 30 which supplies a current Iref2 flowing to primary ground, and to a main terminal of switch 35. The other main terminal of switch 35 is connected to a node 37. A capacitor 36 is connected between node 37 and ground. The voltage at node 37 is the control voltage Co supplied to the drive circuit 1 which may accordingly, adjust the duty cycle in the case of a standard pulse width modulator, or the frequency in resonant systems.

At start-up, the voltage on the capacitor 36 has to be put at a value that causes the duty cycle to be at or near its maximum. Otherwise, the system will not start up.

FIG. 3 shows a waveform of the voltage Va supplied by the auxiliary winding La of the switched-mode power supply according to the invention.

At instant t0, the controllable switching element S1 conducts, the input voltage Vi is connected across the primary winding Lp, and the auxiliary winding voltage Va has a negative value Vneg which equals the input voltage Vi multiplied by the transformation ratio between the auxiliary winding La and the primary winding Lp. The secondary rectifier diode D is non-conductive. At instant t1, the controllable switching element S1 stops conducting, the voltage across the primary winding Lp changes polarity and the secondary rectifier diode D starts conducting. The voltage across the secondary winding Ls now equals the DC output voltage Vout across the load plus the voltage across the secondary rectifier diode D. In the following description, the influence of the voltage across the secondary rectifier diode D is ignored. If the auxiliary winding La were ideally magnetically coupled to the secondary winding Ls, the auxiliary winding voltage Va would obtain a value Vnom which is equal to the DC output voltage Vout multiplied by the transformation ratio between the auxiliary winding La and the secondary winding Ls, as shown in FIG. 3 by the broken line a. However, as the auxiliary winding La is also magnetically coupled to the primary winding Lp, an overshoot voltage, occurring across the primary winding Lp due to the leakage inductance of the transformer T, will also occur across the auxiliary winding La, see the overshoot part between t3 and t4 depicted with b in FIG. 3. At instant t5, the secondary rectifying diode D stops conducting and a dead period starts. The dead period ends at an instant t10 at which the controllable switching element S1 is controlled to be conductive again. At the start of the dead period, the secondary diode D stops conducting and the controllable switching element S1 is not yet conductive and thus, the auxiliary winding La may resonate with parasitics in the system.

The operation of the switched-mode power supply as shown in FIG. 1 with a feedback circuit as shown in FIG. 2 will be described hereinafter.

First, the DC output voltage Vout supplied by the secondary winding Ls to the load Z is assumed to have the desired value. The auxiliary winding voltage Va is closely related to the DC output voltage Vout during the period t3 to t5 when the secondary rectifier diode D conducts. If switch 35 is in the conductive state, a current through switch 35 is equal to the difference between the reference current Iref2 and the output current Im2. The voltage at node 37 will remain unchanged when, during the averaging time (being the time when switch 35 is conductive), the average value of the output current Im2 is equal to the reference current Iref2. In a preferred embodiment, both output currents Im1 and Im2 are equal to the feedback current Icon. In this case, in the steady-state situation in which the DC output voltage Vout has the desired value, the feedback current Icon equals the reference current Iref2, and the auxiliary winding voltage Va equals the value Vnom which is the multiplication of the value of resistor 3 with the reference current Iref2.

When the DC output voltage Vout drops by a certain percentage, the positive part of the voltage across winding La and thus, the feedback current Icon will drop by the same certain percentage. The output current Im2 becomes smaller than the reference current Iref2 and the capacitor 36 will discharge. The voltage on the capacitor 36 drops, and the duty cycle will be increased if a well-known pulse-width mode controller is used. When the DC output voltage Vout rises, the voltage on the capacitor 36 increases and the duty cycle will drop. In this way, a good regulation can be achieved. The reaction speed can be very high and depends only on the value of the reference current Iref2 and the capacitor 36.

The feedback current Icon is equal to the reference current Iref2 when the system is in steady-state operation in which the DC output voltage is stabilized at the desired value. The corresponding DC output voltage Vout depends on the winding ratio between the auxiliary winding La and the secondary winding Ls, and on the value of the resistor 3. In this way, the DC output voltage Vout can be adjusted by adjusting the value of the resistor 3, and virtually all the tolerances in the system can be compensated.

Figure 4:
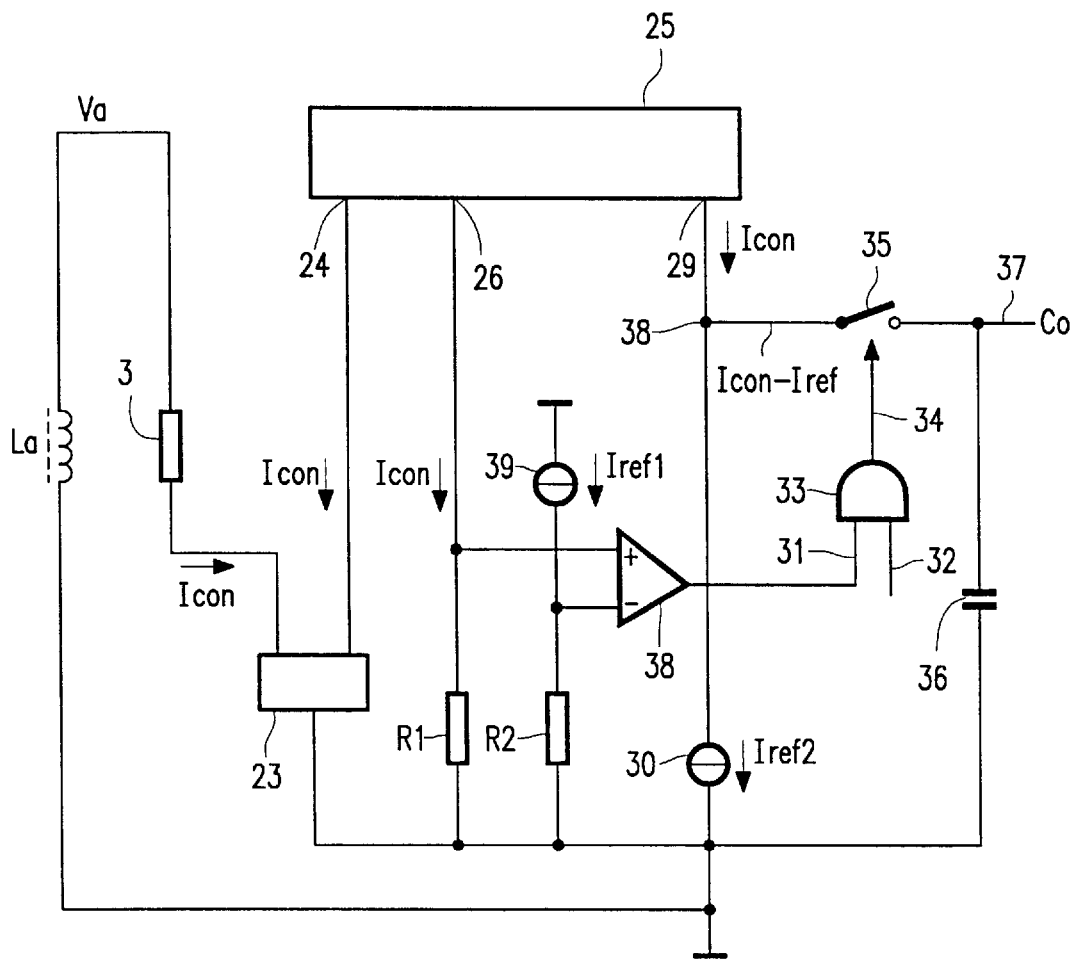
FIG. 4 shows a detailed circuit diagram of another embodiment of the feedback circuit according to the invention.

FIG. 4 shows a detailed circuit diagram of another embodiment of the feedback circuit according to the invention. FIG. 4 differs from FIG. 2 in that the reference current source 27 and the buffer 28 are replaced by the components as described hereinafter. Output 26 of the current mirror 25 is connected to primary ground via a resistor R, and to a non-inverting input of an amplifier 38. An inverting input of the amplifier 38 is connected to primary ground via a resistor R2 and to a current source 39 which supplies a reference current Iref. The output of the amplifier 38 is connected to input 31 of the AND gate 33. The resistor R2 has a value smaller than the value of resistor R1. The switch 35 will be closed if the voltage across the resistor R1 is larger than the voltage across R2 (and the demagnetization signal allows closing of the switch 35), i.e., if the feedback current Icon is larger than the ratio between the resistor R2 and the resistor R1 times the reference current Iref supplied by the current source 39. In a practical situation, the ratio of R2 and R1 is between 0.5 and 0.95. If the ratio were chosen to be smaller, the deteriorating influence of the leading and trailing slopes of the feedback information Va would become too large. If the ratio were chosen to be larger, the risk that the feedback information Va drops below this value would become too large. In the last-mentioned situation, the switched-mode power supply would be out of regulation.

Figure 5:
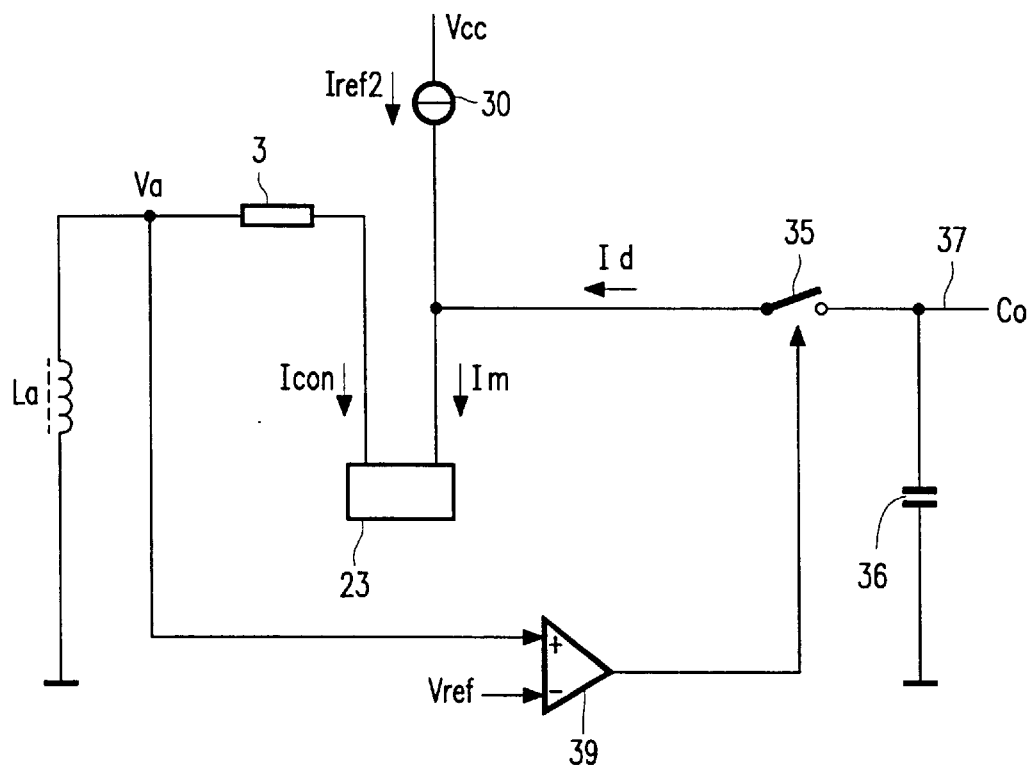
FIG. 5 shows a detailed circuit diagram of another embodiment of the feedback circuit according to the invention.

FIG. 5 shows a detailed circuit diagram of another embodiment of the feedback circuit according to the invention. The auxiliary winding La has a first end connected to primary ground and a second end connected to a feedback input of the feedback circuit 2 via a resistor 3. A feedback current Icon flows through resistor 3 to an input of a first current mirror 23. The current mirror 23 has an output which supplies a mirrored feedback current Im to a first main terminal of a switch 35. A current source 30 supplies a reference current Iref2 flowing to the first main terminal of the switch 35. A second main terminal of the switch 35 is connected to a node 37. A capacitor 36 is connected between node 37 and ground. The voltage at node 37 is the control voltage Co supplied to the drive circuit 1 which may accordingly adjust the duty cycle in the case of a standard pulse-width modulator or the frequency in resonant systems. The capacitor 36 is charged or discharged with the difference of the mirrored feedback current Im and the reference current Iref2. A comparator 39 has a non-inverting input receiving the auxiliary winding voltage Va, an inverting input receiving a reference voltage Vref, and an output for controlling the switch 35. The switch 35 will be in a conductive state when the auxiliary winding voltage Va is larger than the reference voltage Vref.

FIG. 6 shows a block diagram of a circuit for generating a demagnetization protection signal. A comparator 50 receives the feedback voltage Va and a reference value Ref selected near primary ground potential to supply information indicating whether the feedback information Va;Icon is larger than the reference value Ref. A decision circuit 51 receives the indication information to supply the demagnetization signal. The demagnetization signal becomes active at the instant when the feedback information Va;Icon exceeds the reference value Ref (somewhat later than instant t2 in FIG. 3), and becomes inactive at the instant when the feedback information Va;Icon decreases below the reference value Ref (somewhat earlier than instant t7 in FIG. 3). The decision circuit 51 suppresses the positive parts of the resonance waveform occurring from t8 to t10, as is shown in FIG. 3, by keeping the demagnetization signal inactive until the controllable switching element S1 is switched on the next switching period by the drive signal Dr at instant t10. Such a demagnetization protection is known per se from the Motorola Semiconductor Technical data "High flexibility green SMPS controller MC44603".

Figure 7:
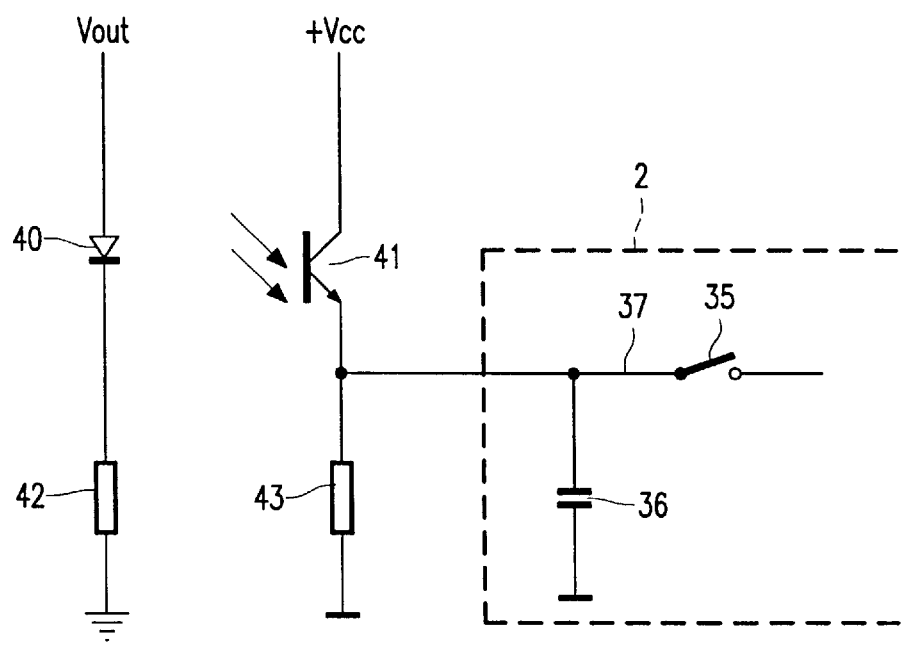
FIG. 7 shows a circuit diagram of an embodiment of the invention wherein the regulation is obtained by using an opto-coupler.

FIG. 7 shows a circuit diagram of an embodiment of the invention wherein the regulation is obtained by using an opto-coupler 40,41. If the feedback circuit 2 is integrated in an IC and node 37 is available at a pin of the IC, this pin can be used as an input for opto-coupler feedback. FIG. 6 shows a part of the feedback circuit 2 which comprises the capacitor 36 and the switch 35. A series arrangement of an opto-coupler diode 40 and a resistor 42 is connected to the DC-output voltage Vout. The opto-coupler diode D is optically coupled with an opto-coupler transistor 41. The opto-coupler transistor 41 is arranged between node 37 and a supply voltage Vcc. A resistor 43 is connected between node 37 and primary ground. A current through the opto-coupler transistor is much higher (typical 2–10 mA) than the current flowing through the switch 35 (order of magnitude: 1–10 uA average typical). So, even when this current flows through the switch 35, the voltage at node 37 is still accurate enough for sufficiently stabilizing the DC output voltage Vout.

The capacitor 36 may be present inside or outside the IC.

The invention has been described with reference to preferred embodiments, but it will be understood that modifications thereof within the principles outlined above will be evident to those skilled in the art, so that the invention is not limited to the preferred embodiments but is intended to encompass such modifications.

The functions performed by the feedback circuit 2 could also be performed by a suitably programmed microprocessor. An A/D converter may be used to convert the analog feedback voltage Va or the analog feedback current Icon into digital values. The window-generating means 20 may be replaced by the microprocessor detecting whether a digital value is higher than a reference value. The microprocessor calculates an average value of the digital values occurring during the period of time when the digital values are higher than the reference value. Instead of averaging, it is also possible to integrate the values.

The DC output voltage Vout may also have a negative polarity. The feedback information Va may have a positive polarity (as described in the embodiments) or a negative polarity. In the latter case, the feedback circuit 2 has to be adapted to cope with the negative polarity of the feedback information Va.

I claim:

1. A switched-mode power supply comprising:

a transformer having a primary winding, a secondary winding, and an auxiliary winding, the secondary winding being coupled to a smoothing capacitor via a rectifier element to supply a DC output voltages a controllable switching device having a main current path arranged in a series arrangement with the primary winding, the series arrangement receiving an input voltages a drive circuit for supplying a drive signal to a control input of the controllable switching device for periodically switching the controllable switching device on and off and a feedback circuit coupled to receive feedback information from the auxiliary winding for supplying a control signal to the drive circuit to control on and/or off-periods of the controllable switching element to obtain a desired value of the feedback information in a steady-state situation, the feedback circuit comprising window-generating means coupled to receive the feedback information for supplying an indication signal indicative of a period of time during which the feedback information is related to the DC output voltage, the feedback circuit further comprising averaging means coupled to receive information related to the feedback information and the indication signal for averaging the information related to the feedback information during said period of time to form the control signal.

2. A switched-mode power supply as claimed in claim 1, characterized in that the window-generating means is adapted to supply an indication signal indicative of a period of time during which the feedback information is larger than a predetermined detection reference value, the predetermined detection reference value being selected near said desired value of the feedback information in such a manner that a substantial part of both leading and trailing edges of the feedback information does not occur within said period of time, the averaging means being adapted to average the information related to the feedback information during said period of time.

3. A switched-mode power supply as claimed in claim 2, characterized in that the switched-mode power supply further comprises a resistor having a first end coupled to receive a feedback voltage from the auxiliary winding, and in that the feedback circuit comprises a current mirror circuit having an input coupled to a second end of the resistor for receiving the feedback information as a feedback current, and an output for supplying the information related to the feedback information being a mirrored feedback current.

4. A switched-mode power supply as claimed in claim 3, characterized in that the feedback circuit further comprises a reference current source for supplying a feedback reference current to the output of the current mirror circuit to generate the information related to the feedback information being a difference current.

5. A switched-mode power supply as claimed in claim 3, characterized in that the averaging means comprises a capacitor and a switching element for providing the information related to the feedback information to the capacitor only during said period of time during which the indication signal indicates that the feedback information is larger than the predetermined detection reference value, a voltage on the capacitor being coupled to supply the control signal.

6. A switched-mode power supply as claimed in claim 2, characterized in that the window-generating means comprises voltage-comparison means for comparing the feedback information being a feedback voltage with the predetermined detection reference value being a reference voltage, said voltage-comparison means supplying the indication signal for indicating a period of time during which the feedback voltage is larger than a predetermined reference voltage.

7. A switched-mode power supply as claimed in claim 4, characterized in that the current mirror circuit is adapted to supply a further mirrored feedback current, and the window-generating means is adapted to receive the further mirrored feedback current as the feedback information and a further reference current as the predetermined detection reference value for generating the indication signal indicating a period of time during which the further mirrored feedback current is larger than the further reference current, the further reference current being the feedback reference current multiplied by a predetermined factor, the factor being larger than zero and smaller than one.

8. A switched-mode power supply as claimed in claim 1, characterized in that the switched-mode power supply further comprises a demagnetization detection circuit for receiving the feedback information and for supplying a demagnetization signal indicating a period of time during which the rectifier element is conductive, the averaging means being adapted to allow averaging of the information related to the feedback information only during periods in time in which the demagnetization signal indicates that the rectifier element is conductive.

9. A switched-mode power supply as claimed in claim 5, characterized in that the switched-mode power supply further comprises an opto-coupler having a photo-diode coupled to the secondary winding, and a photo-transistor coupled to the capacitor, a current flowing through the photo-transistor being at least one order of magnitude larger than the information related to the feedback information.

10. A display apparatus comprising:

a display devices a signal-processing circuit coupled to receive input display information for supplying drive signals to the display device for displaying the input display information; and a switched-mode power supply for supplying supply voltages to the signal-processing circuit and the display device, the switched-mode power supply comprising:

a transformer having a primary winding, a secondary winding, and an auxiliary winding, the secondary winding being coupled to a smoothing capacitor via a rectifier element to supply a DC output voltage;

a controllable switching device having a main current path arranged in a series arrangement with the primary winding, the series arrangement receiving an input voltages;

a drive circuit for supplying a drive signal to a control input of the controllable switching device for periodically switching the controllable switching device on and off; and a feedback circuit coupled to receive feedback information from the auxiliary winding for supplying a control signal to the drive circuit to control on and/or off-periods of the controllable switching element to obtain a desired value of the feedback information in a steady-state situation, the feedback circuit comprising window-generating means coupled to receive the feedback information for supplying an indication signal indicative of a period of time during which the feedback information is related to the DC output voltage, the feedback circuit further comprising averaging means coupled to receive information related to the feedback information and the indication signal for averaging the information related to the feedback information during said period of time to obtain the control signal.

* * * * *